Nov. 18, 1958             J. E. SNOW            2,860,732
PNEUMATIC ENERGY ABSORBER FOR AIRCRAFT BARRIERS
Filed Aug. 1, 1955                                       3 Sheets-Sheet 1
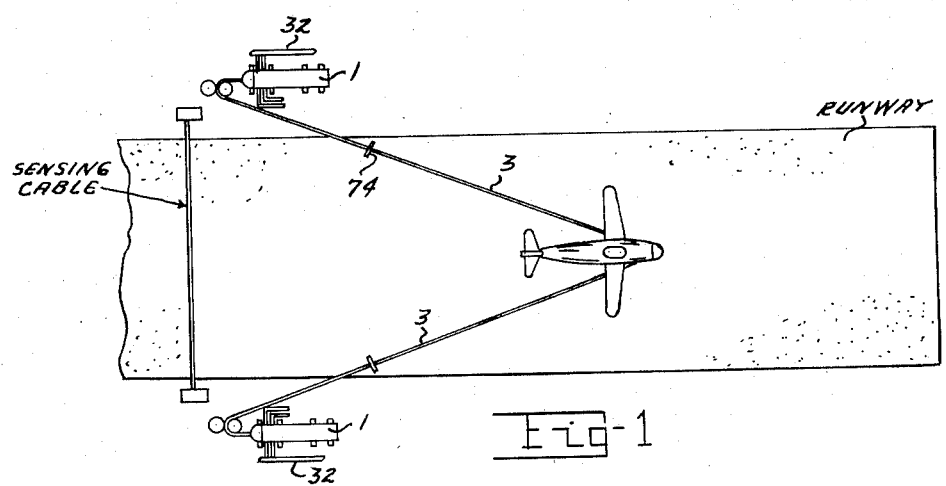
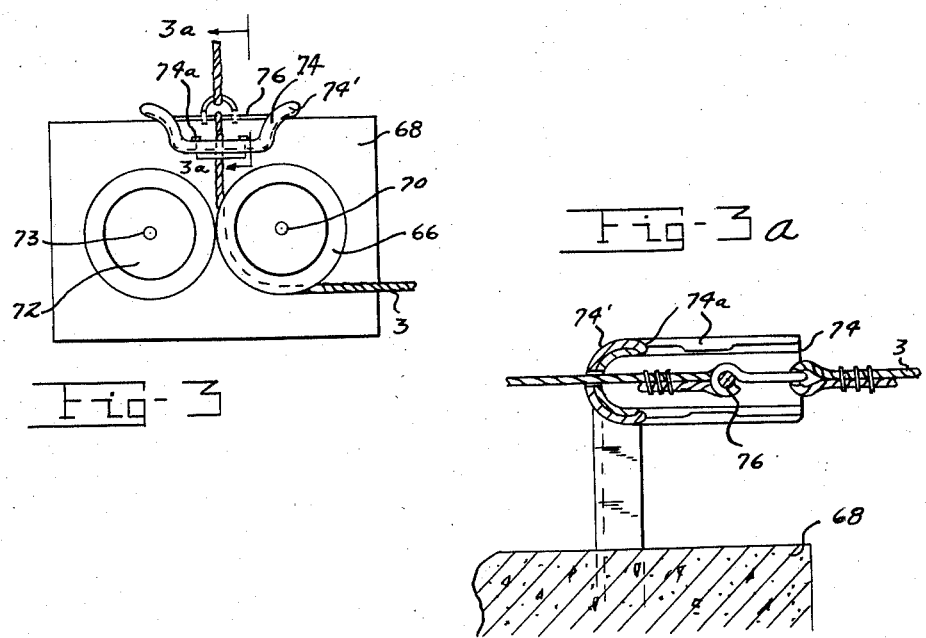
INVENTOR.
JOHN E. SNOW
BY
*John B Brady*
ATTORNEY

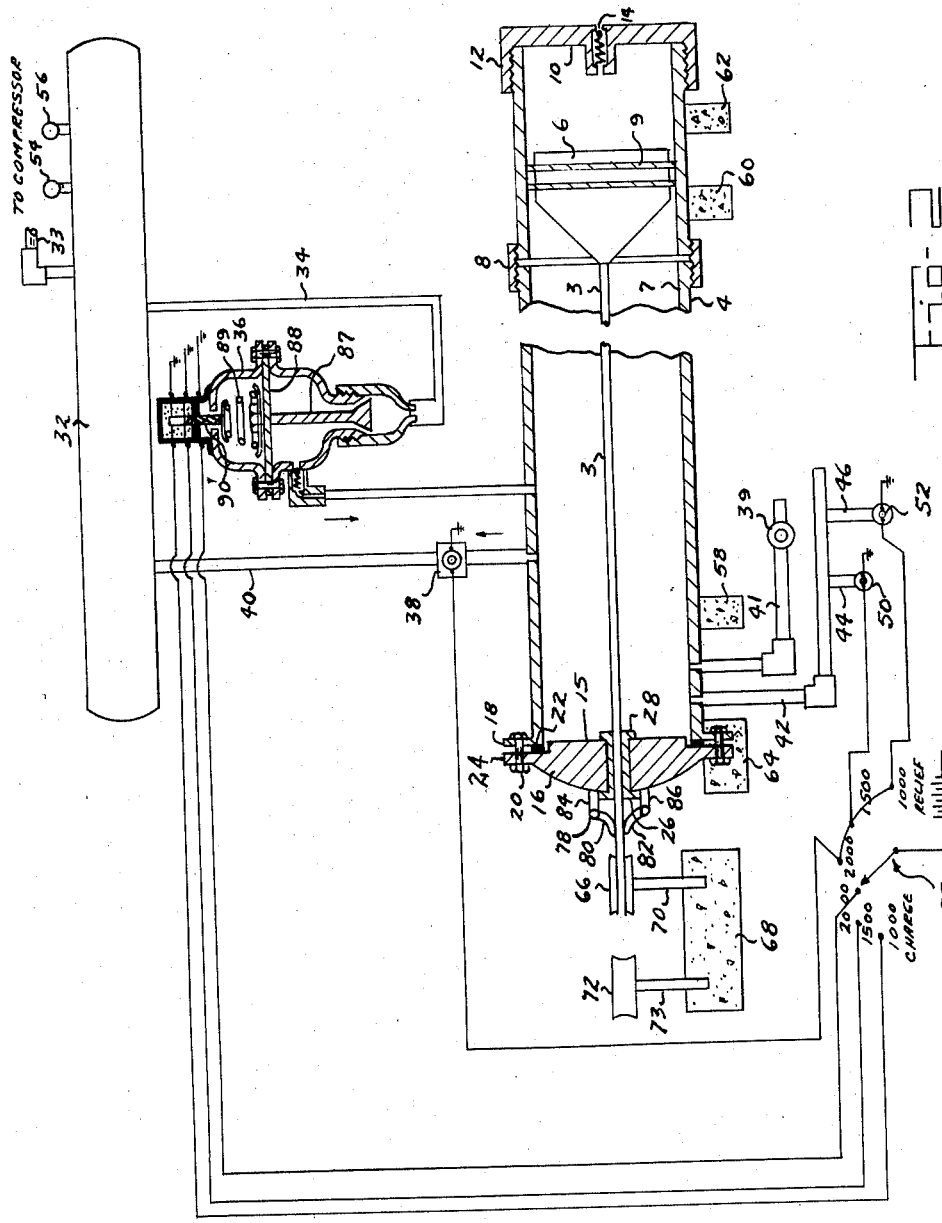

Nov. 18, 1958 J. E. SNOW 2,860,732
PNEUMATIC ENERGY ABSORBER FOR AIRCRAFT BARRIERS
Filed Aug. 1, 1955 3 Sheets-Sheet 3

INVENTOR.
JOHN E. SNOW
BY
John B. Brady
ATTORNEY

United States Patent Office 2,860,732
Patented Nov. 18, 1958

2,860,732

PNEUMATIC ENERGY ABSORBER FOR AIRCRAFT BARRIERS

John E. Snow, Fairborn, Ohio

Application August 1, 1955, Serial No. 525,754

7 Claims. (Cl. 188—87)

(Granted under Title 35, U. S. Code (1952), sec. 266)

The invention described herein may be manufactured and used by or for the Government of the United States of America for governmental purposes without the payment of any royalties thereon or therefor.

My invention relates to that class of devices known as energy absorbers and more particularly to the devices for absorbing the energy connected with aircraft barriers.

As described in my copending application, Patent 2,770,431, granted November 13, 1956, when an emergency situation is created and it is necessary to stop the forward travel of an aircraft, it has been found feasible to use an aircraft barrier which raises an arresting cable from the runway to engage the aircraft and gradually bring it to a halt. The arresting cable is attached to drag means lying on each side of the runway and, as the aircraft with the arresting cable proceeds down the runway, the weight of the drag increases so that the kinetic energy of the aircraft is gradually absorbed and the aircraft comes to rest. One of the means of providing a suitable drag for the arresting cable is in the form of anchor chains which are laid along side of the runway for a distance of several hundred feet. Each chain is attached to one end of the arresting cable and, as the aircraft drags the arresting cable down the runway, more and more of the anchor chain is picked up and swept on to the runway providing increasing retarding means to absorb the kinetic energy of the aircraft.

However, there are several disadvantages to employing anchor chains as a drag means and I have discovered a new device for absorbing the kinetic energy which has been proven much more satisfactory in practice than the present anchor chains.

It is the principal object of my invention to provide a means for absorbing the kinetic energy of an aircraft.

It is a further object of my invention to provide energy absorbing means for arresting the forward motion of an aircraft by attaching each end of an arresting cable to a piston placed within a tube filled with high pressure air whereby the piston is dragged toward the end of the tube increasing the air pressure which is bled off at a predetermined pressure, thus providing a constant drag on the arresting cable.

It is a further object of my invention to provide a means to transfer air under pressure created by a moving piston to another closed container to accumulate said air pressure and to retain as much of the original air pressure as possible.

It is a still further object of my invention to provide a means of changing within the tube, air at a certain predetermined pressure to another lower predetermined pressure.

My means of achieving the foregoing objects may be more readily apprehended by having reference to the accompanying drawings which are appended hereto and form a part hereof.

Figure 1 is a schematic view of a runway with my invention in place.

Figure 2 is a side elevation partly in section schematically showing the arrangement of parts of my invention.

Figure 3 is a detail view of the arresting cable before the engagement.

Figure 3A is a sectional view taken on lines 3A—3A of Figure 3.

Similar numerals refer to similar parts throughout the specification.

Figure 4:
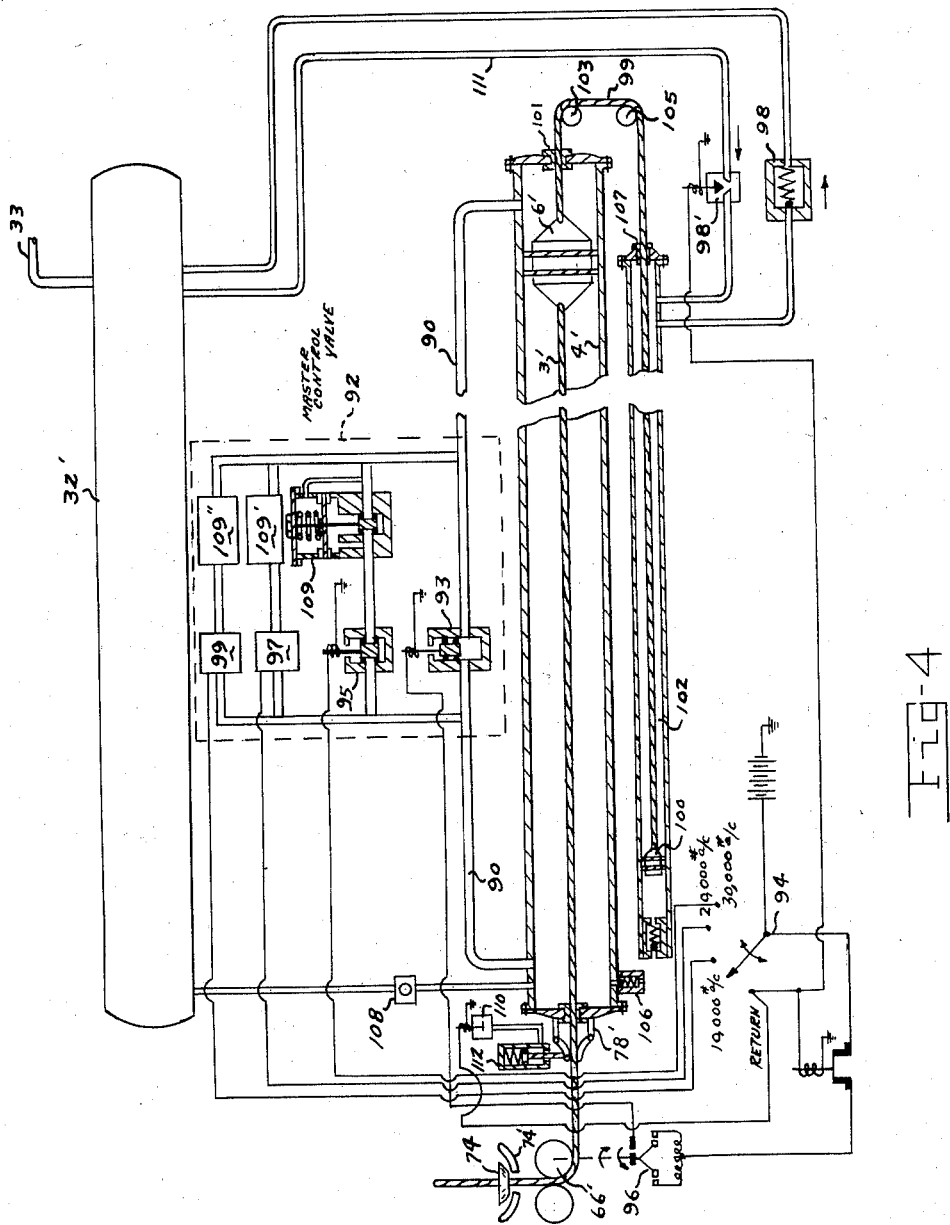
Figure 4 is a schematic view of a modified form of my invention.

As shown schematically in Figure 1, indicated generally as 1, one of my energy absorbers is attached to each end of the arresting cable of an aircraft barrier such as is described in my copending application, Patent 2,770,431, granted November 13, 1956.

Since I normally require two energy absorbers and each energy absorber is exactly similar, I shall describe only one.

I provide a drag tube 4 which I prefer to have made of steel but which could be constructed of any suitable material that will be sufficiently smooth on the inside to permit a piston 6 to reciprocate therein and be of sufficient strength to withstand air pressures from 2,000 to 4,000 p. s. i.

The drag tube 4 may, for convenience, be in commercial lengths joined together by expansion joints 8 as shown in the drawing. While there may be as many sections of the drag tube 4 as required, I have shown only one joint 8 for illustrative purposes. The joint 8 may be in the form of any commercially acceptable pressure tight fitting and, since it forms no part of this invention, I shall not particularly describe it.

At one end 10 of the drag tube 4, I provide a cap 12 with a bleed orifice 14 therein for purposes which will appear. The cap 12 may be threaded on the drag tube 4 as shown or may be attached in any other suitable manner. At the other end 15 of the drag tube 4, I provide a header 16 having a lip 24 which may be fastened to a flange 18 by bolts 20 or the like. Since the header 16 must withstand considerable air pressure, I provide a gasket 22 intermediate the flange 18 and the lip 24 of the header 16. I provide an orifice 26 in the header 16 to permit passage of the wire rope arresting cable 3 to pass therethrough. I provide sealing means 28 in the orifice around the arresting cable 3 to prevent the escape of air as the arresting cable 3 runs out of the drag tube 4. Since the rate of travel of the arresting cable 3 through the orifice 26 will likely be very high immediately after the aircraft engages the barrier, the seal may require frequent replacement. In practice I have found a neoprene grommet performs satisfactorily. By providing rubber impregnation of the wire rope of the cable 3, I have succeeded in reducing the wear on the grommet. Inside the drag tube 4 at the end of the arresting cable 3, I mount the piston 6 with suitable piston rings 9 fitted thereto. Because of the heat generated in the rapid travel of the piston 6 inside the drag tube 4, I have found metal piston rings perform more satisfactorily than rings of other material. However, depending upon the size of the piston 6, I have knowledge that the sealing means between the piston 6 and the inner side 7 of the drag tube 4 may be of many different materials such as woven brake lining material and the like.

I provide an accumulator tube 32 of a capacity approximately two and one-half times that of the drag tube 4. While the accumulator 32 may be placed at any convenient proximity to the drag tube 4, for illustrative purposes I show the accumulator 32 mounted above the drag tube 4 in Figure 2. In practice I prefer to charge the accumulator 32, which is connected to the drag tube 4 by means of suitable pipe 34, through a tube 33 connected to suitable compressors (not shown). The pipe 42 has variable pressure responsive valves 50 and 52. In practice, I prefer that valve 52 be opened at a pressure of 1,000 p. s. i. and valve 50 be opened at a pressure of 1,500 p. s. i. I provide a preset high pressure relief safety valve 54 and an automatic shut off valve 56 for the compressor (not shown) on the accumulator 32 as shown. A relief tube 41 is positioned close to the header 16 and contains a valve 39.

Because the forces encountered in the operation of my invention are necessarily very great, I take care to place the drag tube 4 on sound footings which anchor the tube and hold it in place during operation. I provide reinforced concrete saddles 58, 60 and 62, on which are mounted suitable fittings to allow for thermal expansion, which may partially encase the drag tube 4 and the anchor 64 is of suitable construction to hold the flange 18 against linear displacement.

I provide a sheave 66 positioned to pass the arresting cable 3. I mount the sheave 66 on a concrete step 68 in which the lower portion of the spindle 70 of the sheave 66 is buried. I mount an idler 72 on spindle 73 in the step 68 as shown.

Referring to Figure 3A, I provide a swaged fitting 74 attached to the arresting cable 3 to limit the rearward travel of the piston 6. This swaged fitting 74 seats itself between the sheaves as shown in Figure 3 and thus provides for maintaining a predetermined amount of slack in the arresting cable 3 lying across the runway between the sheaves.

However, in this form of my invention, I achieve the necessary tension or slack control of the arresting cable, as explained in my copending application Patent 2,770,431, granted November 13, 1956, by providing that the swaged fitting 74 is inserted in a socket 74' in such a manner that it will release the swaged fitting 74 upon a predetermined pull upon the arresting cable 3. This predetermined pull is due to the engaged aircraft pulling the arresting cable 3 with sufficient force to force the swaged fitting 74 out of socket 74' and to overcome the inertia of piston 6, thereby starting the arresting gear on its energy absorbing cycle. When the arresting cable 3 is raised by the actuator strap (not shown), the tension wave which is created, as described in my copending application Patent 2,770,431, granted November 13, 1956, is of insufficient force to cause the swaged fitting 74 to be jerked from the socket 74'. The tension wave created in the arresting cable is thus reflected by the pull from the socket 74'. The tension wave thus reflected will then not interfere with normal cable loop formation accomplished by the actuator strap and lifter straps as described in my copending application Patent 2,770,431, granted November 13, 1956. In practice I prefer to adjust the system so that a pull of approximately 5,000 pounds will release the swaged fitting 74 from the socket 74'. This pull which is required to release swaged fitting 74 from socket 74' can be preset in any number of ways. One method used could be that of the initial pressure setting in the drag tube 4 being so predetermined it would require a pull of approximately 5,000 pounds before piston 6 is moved, thus allowing release of fitting 74 from socket 74'. This could be used on the arrangement described in Figure 3. Since there are two of these sockets and swaged fittings, I have thus provided that the arresting cable, which before engagement by an aircraft is lying in slack condition upon the runway, and which when flung into the air by the barrier engaging the aircraft will exert an insufficient pull (at this stage of engagement) upon the swaged fitting 74 to move fitting 74 out of the socket 74' thus the tension wave will be reflected back toward the point of engagement. Later in the engagement phase when the cable is engaged with the main landing gear or part of the aircraft, sufficient force will be available to cause the socket to separate.

I have shown in Figure 3A one form of means by which I provide that the swaged fitting 74 is held in the fitting 74'. I accomplish this by providing turned lips 74A which must be straightened out to provide the release of the swaged fitting 74. The force required to turn the lips 74A will provide the reflection of the tension wave.

Of course, the air pressure in the drag tube 4 will be sufficient to resist forward movement of the piston until the tension wave is reflected since the tube 4 is charged with at least 1,000 p. s. i. Thus the swaged fitting described in Figure 3 is not necessary, although desirable.

If it is desired, I provide a pair of shear pins 76 in the arresting cable. The shear pin 76 may be of sufficient strength not to shear unless and until the piston 6 has travelled the full length of the drag tube 4 and has hit the header 16 due to the failure of the mechanism to stop the aircraft before the piston 6 reaches that point. This shear pin 76 will then separate the arresting cable and prevent further damage to the energy absorber.

In order to prevent the air pressure in the drag tube 4 from causing the piston 6 to move rearwardly after engagement of the arresting cable 3 while disentangling the aircraft therefrom, I provide a nonreturn device 78, comprised of a pair of clevises 80 and 82 mounted as shown on bases 84 and 86 respectively. The clevises 80 and 82 may be laid back by mechanical or hydraulic means before returning the piston 6 to its retracted position.

In operation the invention is designed to provide a relatively constant drag of a predetermined amount during engagement of the arresting cable by an aircraft. I have found in practice that 1,000 p. s. i. in each drag tube provides a satisfactory drag for relatively light weight fighter aircraft. I have found 1,500 p. s. i. in each drag tube provides sufficient drag for heavier aircraft. This factor may be increased as required for aircraft of heavier design such as medium bombers.

I charge the drag tube 4 through pipe 34 from the accumulator 32 which is charged through tube 33 from the compressors (not shown). Since the use of my invention is largely under emergency conditions, I prefer to charge the drag tube 4 with the highest pressure likely to be required. Thus I would charge the drag tube 4 through tube 34 with 1,500 p. s. i. This pressure drives the piston 6 into its retracted position with the swaged block 74 seated in the socket 74', Figure 3. The clevises 80 and 82 are now positioned to prevent return of the piston 6. After the pressure in the drag tube 4 reaches 1,500 p. s. i., a valve 36 in the pipe 34 is closed.

The valve 36 may be preset to close at a pressure of 1,000, 1,500, and 2,000 p. s. i. This valve 36 may be any conventional three coil solenoid operated pressure regulator or pressure reducing valve incorporated in one valve body as shown in Figure 2. Thus by setting the switch 77 to any of the desired pressures, namely, 1,000, 1,500 or 2,000 p. s. i. it would provide electrical operation of the respective coil of the solenoid. This would open or adjust the stem valve 87 to the desired point allowing air to flow to the regulating diaphragm 88. The regulating diaphragm 88 would then close the stem valve 87 when the desired pressure in the drag tube 4 is reached. This would be adjusted by the tension setting of a spring 89 of the reducing valve 36. Thus each solenoid coil when energized by the switch 77 would cause a predetermined travel or setting of the solenoid plunger 90', thus changing the spring preload on the diaphragm and thereby adjusting the regulator valve 36 to the desired 1,000, 1,500 or 2,000 p. s. i. setting. Thus the drag tube 4 remains charged at a selected pressure, for instance 1,500 p. s. i. until the piston 6 commences its forward travel.

As soon as the sensing cable (Figure 1) is contacted, the barrier is raised into position. Upon engagement of the aircraft with the arresting cable 3, the piston 6 begins to move forward toward the header 16, further compressing the air already at 1,500 p. s. i. The relief valve 38 opens upon the pressure within the drag tube 4 reaching 2,000 p. s. i. and the excess air enters the accumulator 32. Thus the drag on the piston 6 is constant at 2,000 p. s. i. until the arresting cable has stopped the aircraft. Should the piston pass the opening in the tube of the pipe 34, after this point the air is compressed above 2,000 p. s. i. until the relief pressure of valve 39 is reached. Usually the pressure thus increased serves to cushion the shock of the aircraft if stopping beyond the 2,000 p. s. i. point should occur. Under these conditions the pressure rapidly increases and, unless the grommet 28 blows out, the relief valve 39 will open and relieve the pressure. The position of the pipes illustrated in Figure 2 are not positioned as required in operation but are drawn for illustrative purposes and clarity. I prefer to set the relief pressure of the valve 39 at about 4,000 p. s. i. If the pressure exceeds this amount, then the excess air is passed into the accumulator 32 through suitable piping (not shown). The shear pin 76 is designed to break at 100% ultimate cable load. This break in the arresting cable would end the service of the energy absorber for this operation. The remaining air pressure in the drag tube 4 may be sufficient to drive the piston without the arresting cable back to its retracted position but the clevises 80 and 82 will prevent this until it is desired. These clevises provide free run of the cable for arrestation direction only. The bleed orifice 14 is of the normal ball check type and permits the pressure on the rear of the piston to remain at atmospheric pressure.

Since normally the aircraft is successfully arrested before the piston 6 has passed the pipe 40, I recharge the drag tube 4 by means of opening the valve 36 and allowing sufficient air from the accumulator 32 to charge the drag tube 4. This also serves to drive the piston 6 back to the starting position.

As set forth above, I provide two solenoid operated pressure responsive valves 50 and 52 in the system. If the aircraft requiring the emergency use of the aircraft barrier is of the lighter type, by actuating the solenoid valve 52, I permit the pressure in the drag tube 4 to fall instantly to 1,000 p. s. i.

It will be clear that if desired, I could provide a plurality of such solenoid operated valves to be actuated at varying pressures. I could then charge the system with the highest pressures required and instantly bleed off air to reduce the pressure in the system to that suitable for the aircraft requiring emergency arresting.

By setting the master control switch 77 at one of the 1,000, 1,500 or 2,000 p. s. i. "charge" positions it can operate pressure responsive valve 36 to charge the drag tube 4 from the accumulator 32 to the desired pressure, for example, 1,000, 1,500, or 2,000 p. s. i. After the charging operation, the switch 77 is set to the desired pressure responsive valve 38, 50 or 52 depending upon the weight of the aircraft to be arrested. This sets the pressure of the drag tube 4 at the desired pressure and, as compression of the air occurs during travel of piston 6, it is clear that the proper pressure responsive valve will bleed off the excess pressure consistent with that set by switch 77. In this arrangement as set forth in Figure 2, the only air being returned to the accumulator is that when the drag tube is to operate at 2,000 p. s. i., then valve 38 is responding. If the valve 50 or 52 is "set," the pressures are lower than that of valve 38 and a "blow off" to the atmosphere occurs. However, valves 50 and 52 could be connected to an accumulator similar to 32 and could operate exactly as does valve 38. These arrangements are not shown.

Referring to Figure 4, I show a modified form of my invention wherein I provide a differential pressure tube 90 which is connected to the forward and rearward extremities of the drag tube 4' in which a piston 6' is adapted to reciprocate substantially as shown. The master control valve 92 may be composed of a combination of a normally open conventional solenoid valve 93 and normally closed solenoid valves 95, 97 and 99. The solenoid 93 permits the travel of pressure from either side of the piston 6 in the tube 4 so that substantially zero differential pressure is achieved in the tube 4'.

However, a centrifugal switch 96 will close the solenoid 93 when the cable 3' is set in motion and the switch will remain closed so long as the cable 3' is in motion. During arresting motion of cable 3' the closing of solenoid 93 forces the air to flow through one of the opened solenoids 95, 97 and 99 which were previously selected by the setting of the selector switch 94 as shown.

The diaphragm valve 109 which opens at a predetermined pressure regulates the desired pressure differential on either side of the piston 6', and by providing one of these valves 109 for each solenoid 95, 97 and 99 (such as valves 109' and 109''), the selector switch 94 may be selectively employed to release pressure in excess of that desired by energizing the proper solenoid governing the proper diaphragm valve. A master control valve 92, adapted to be opened at a predetermined pressure differential in the tube 90 is thus controlled by the selector switch 94. It will be clear that when the master control valve 92 is open, the pressure on either side of the piston 6' will equalize. The centrifugal switch 96 closes the solenoid 93 of the master control valve 92 when the cable 3' is in motion. The regulator valve 108 keeps the drag tube 4 charged with air from the accumulator 32.

I provide a retracting tube 102 in which a piston 100 reciprocates. The piston 100 is connected to the rearward side of the piston 6' by a steel tape 99 which passes over pulleys 103 and 105 as shown. In practice, I prefer to employ as the tape 99 a steel tape rectangular in cross section. This reduces air pressure sealing problems at the ports 101 and 107 since both the drag tube 4' and the retracting tube 102 may be provided with caps which contain apertures 101 and 107 suitably sealed for the passage of the tape 99 as shown. As set forth above, there are many materials such as thermo-setting plastics from which satisfactory seals may be formed.

I provide a check valve 98 which may be spring loaded or otherwise adjusted for predetermined pressure release to maintain sufficient pressure differential between the pressure in accumulator 32' and the forward side of the piston 100 in the retracting tube 102 to prevent the tape 99 becoming completely slack during the arrestation of an aircraft. Suitable piping 111 may be provided for this purpose. The valve 98' is a solenoid operated valve connected to return position of switch 94.

In operation, as soon as the arresting cable 3' is engaged by an aircraft it commences to travel over the pulley 66' as shown. The centrifugal switch 96 opens its circuit and the valve 92 becomes responsive to the setting of the switch 94. By predetermined loading of the switch 94, it is possible to set the pressure on the piston 6' so that it will operate at the pressure best adapted to arrest a particular weight aircraft as set forth above. The 10,000 #A/C, 20,000 #A/C and 30,000 #A/C legends immediately associated with the switch 94 in Figure 4 are for the purpose of setting the switch 94 for different weight aircraft, for instance, 10,000 lb. aircraft, 20,000 lb. aircraft and 30,000 lb. aircraft. The sign #A/C is conventional and "#" indicates "pounds" and A/C denotes "aircraft." The valve 92 will permit the excess pressure to bleed off to the opposite side of the piston 6' as controlled by the switch 94 when set for a predetermined pressure differential. Thus the pressure differential on either side of the piston 6' can be controlled for movement of the piston 6' in either direction. During arrestation of an aircraft, the piston 6' pulls the retracting tape 99 forcing the piston 100 down the retracting tube 102. The pressure thus created in the tube 102 is bled off through the check-valve 98 when it exceeds approximately 3,000 p. s. i. and compressed back into the accumulator 32'.

At the end of the arrestation, the pulley 66' will cease rotating and the centrifugal switch 96 opens its circuit which again opens the valve 92, practically equalizing the pressure on both sides of the piston 6'. A slight pressure differential is sufficient to maintain some tension on the cable 3' which prevents the rearward motion of the piston 6' by means of the nonreturn device 78'.

To return the piston 6' to its fully retracted position, the switch 94 is set to a "return" position which may be connected to release the nonreturn device 78'. This may be accomplished by switch 94 opening a solenoid valve 100 which allows air pressure to operate a spring loaded cylinder 112, for mechanically unlocking the clevises 78'. This setting of the switch 94 also keeps the valve 92 open maintaining equal pressure on both sides of piston 6'. This setting of switch 94 also keeps open the valve 92 by opening the relay keeping solenoid 93 open, thus maintaining equal pressure on both sides of piston 6. This setting of switch 94 also opens valve 98' applying predetermined pressure to retracting piston 100. With pressure equalized on both sides of piston 6', the retracting piston working under air pressure from the accumulator 32' through valve 98' develops sufficient force to retract the piston 6'. Of course this force must be predetermined by calculations of the weight to be moved. The piston 100 then develops a pull on the piston 6' through tape 99, the pull being exerted on the rearward side of piston 6'.

Thus return of the piston 6' will continue with assistance of the piston 100 pulling the piston 6' by the tension on the tape 99 travelling over the pulleys 103 and 105.

The check valve 98 maintains sufficient pressure differential during arrestation to prevent the piston 100 from creating slack in tape 99. The air compressed by piston 100 during arrestation is returned to the accumulator 32 by means of valve 98 and used again during the retracting stroke. The diameter of the retracting tube 102 is approximately one-fourth that of the drag tube 4' and is sufficient to provide a retracting force of approximately 2,000 pounds.

Valve 106 is a high pressure relief valve set at approximately 4,000 p. s. i. similar to the valve 39 as shown in Figure 2. During repeated arrestations the energy absorbed may be large enough to cause a temperature rise in the air with a resultant pressure rise. This valve prevents excess pressure from overheating and may be connected to the accumulator 32' if desired.

I have found in practice that the volume of air on the rearward side of the piston 6' is relatively small, therefore as the piston 6' travels down the drag tube 4', the volume on the rearward side of the piston 6' will not be sufficient to upset the setting of the valve 92. The piston 6' will not need to travel an excessive distance in order to build up pressure to cause the valve 92 to function.

Having described my invention, what I regard as new and desire to protect by Letters Patent is:

1. An energy absorber assembly comprising a cylinder having its forward end airtight, there being a piston within said cylinder, said piston adapted to reciprocate within said cylinder, means on said piston to form an airtight seal with said cylinder, an aircraft arresting cable passing through said airtight end, means in said airtight end to seal said forward end and said arresting cable, said last named means adapted to permit said arresting cable to be passed in and out of said airtight end, in airtight relationship, said arresting cable being attached to said piston at its forward end and adapted to pull said piston forwardly in said cylinder, means exterior of said cylinder to charge said cylinder with air under predetermined pressure exerted against the forward side of said piston and said airtight end, means responsive to air pressure connected to said cylinder to permit the escape of air between said piston and said airtight end at pressure in excess of said predetermined air pressure whereby when said arresting cable pulls said piston forwardly inside of said cylinder said piston thereby increasing the air pressure within said cylinder forward of said piston causing said escape means to permit said excess air pressure to escape from within said cylinder.

2. An energy absorber assembly comprising a cylinder having its forward end airtight, there being a piston within said cylinder, said piston adapted to reciprocate within said cylinder, means on said piston to form an airtight seal with said cylinder, an aircraft arresting cable passing through said airtight end, means in said airtight end to seal said forward end and said arresting cable, said last named means adapted to permit said arresting cable to be passed in and out of said airtight end, in airtight relationship, said arresting cable being attached to said piston at its forward end and adapted to pull said piston forwardly in said cylinder, means exterior of said cylinder to charge said cylinder with air under predetermined pressure exerted against the forward side of said piston and said airtight end, means to selectively predetermine the amount of said air pressure, means responsive to air pressure connected to said cylinder to permit the escape of air between said piston and said airtight end at pressure in excess of said predetermined air pressure whereby when said arresting cable pulls said piston forwardly inside of said cylinder said piston thereby increasing the air pressure within said cylinder forward of said piston causing said escape means to permit said excess air pressure to escape from within said cylinder.

3. An energy absorber assembly comprising a cylinder having its forward end airtight, there being a piston within said cylinder, said piston adapted to reciprocate within said cylinder, means on said piston to form an airtight seal with said cylinder, an aircraft arresting cable passing through said airtight end, means in said airtight end to seal said forward end and said arresting cable, said last named means adapted to permit said arresting cable to be passed in and out of said airtight end, in airtight relationship, said arresting cable being attached to said piston at its forward end and adapted to pull said piston forwardly in said cylinder, means exterior of said cylinder to charge said cylinder with air under predetermined pressure exerted against the forward side of said piston and said airtight end, means to selectively predetermine the amount of said air pressure, means responsive to air pressure connected to said cylinder to permit the escape of air between said piston and said airtight end at pressure in excess of said selectively predetermined air pressure whereby when said arresting cable pulls said piston forwardly inside of said cylinder said piston thereby increasing the air pressure within said cylinder forward of said piston causing said escape means to permit said excess air pressure to escape from within said cylinder.

4. An energy absorber assembly comprising a cylinder having its forward end airtight, there being a piston within said cylinder, said piston adapted to reciprocate within said cylinder, means on said piston to form an airtight seal with said cylinder, an aircraft arresting cable passing through said airtight end, means in said airtight end to seal said forward end and said arresting cable, said last named means adapted to permit said arresting cable to be passed in and out of said airtight end, in airtight relationship, said arresting cable being attached to said piston at its forward end and adapted to pull said piston forwardly in said cylinder, means exterior of said cylinder to charge said cylinder with air under predetermined pressure exerted against the forward side of said piston and said airtight end, means to selectively predetermine the amount of said air pressure, means responsive to air pressure connected to said cylinder to permit the escape of air between said piston and said airtight end at pressure in excess of said selectively predetermined air pressure, means to selectively control the pressure of said escaped air and pass said controlled air pressure to the rear side of said piston within said cylinder.

5. An energy absorber assembly comprising a cylinder having its forward end airtight, there being a piston within said cylinder, said piston adapted to reciprocate within said cylinder, means on said piston to form an airtight seal with said cylinder, an aircraft arresting cable passing through said airtight end, means in said airtight end to seal said forward end and said arresting cable, said last named means adapted to permit said arresting cable to be passed in and out of said airtight end, in airtight relationship, said arresting cable being attached to said piston at its forward end and adapted to pull said piston forwardly in said cylinder, means exterior of said cylinder to charge said cylinder with air under predetermined pressure exerted against the forward side of said piston and said airtight end, means to selectively predetermine the amount of said air pressure, means responsive to air pressure connected to said cylinder to permit the escape of air between said piston and said airtight end at pressure in excess of said selectively predetermined air pressure, means to selectively control the pressure of said escaped air and pass said controlled air pressure to the rear side of said piston within said cylinder, and means connected to the rear side of said piston to pull said piston rearwardly, said means comprising a secondary cylinder, said cylinder having one end airtight, there being a piston in said cylinder adapted to reciprocate within said cylinder in airtight relationship, means to connect said piston to the rear side of said first named piston, said means passing through the airtight end of said secondary cylinder and the airtight rear end of said first named cylinder, means in said airtight ends to permit said connecting means to pass in airtight relationship, means connected to said secondary cylinder adjacent its airtight end to pass air under pressure into said secondary cylinder and means connected to said secondary cylinder adjacent its airtight end to pass air under pressure out of said secondary cylinder.

6. An energy absorber assembly comprising a cylinder having its forward end airtight, there being a piston within said cylinder, said piston adapted to reciprocate within said cylinder, means on said piston to form an airtight seal with said cylinder, an aircraft arresting cable passing through said airtight end, means in said airtight end to seal said forward end and said arresting cable, said last named means adapted to permit said arresting cable to be passed in and out of said airtight end, in airtight relationship, said arresting cable being attached to said piston at its forward end and adapted to pull said piston forwardly in said cylinder, means exterior of said cylinder to charge said cylinder with air under predetermined pressure exerted against the forward side of said piston and said airtight end, means to selectively predetermine the amount of said air pressure, means responsive to air pressure connected to said cylinder to permit the escape of air between said piston and said airtight end at pressure in excess of said selectively predetermined air pressure, means to selectively control the pressure of said escaped air and pass said controlled air pressure to the rear side of said piston within said cylinder, and means connected to the rear side of said piston to pull said piston rearwardly, said means comprising a secondary cylinder, said cylinder having one end airtight, there being a piston in said cylinder adapted to reciprocate within said cylinder in airtight relationship, means to connect said piston to the rear side of said first named piston, said means passing through the airtight end of said secondary cylinder and the airtight rear end of said first named cylinder, means in said airtight ends to permit said connecting means to pass in airtight relationship, means connected to said secondary cylinder adjacent its airtight end to pass air under predetermined pressure into said secondary cylinder and means connected to said secondary cylinder adjacent its airtight ends to pass air under predetermined pressure out of said secondary cylinder.

7. An energy absorber for an aircraft cable barrier comprising a fixed drag cylinder having closed forward and rear ends, a drag piston reciprocatable within said cylinder, an aircraft arresting cable passing through the forward end of said drag cylinder, sealing means between said forward end and said arresting cable to prevent leakage therebetween, fixed releasable means connected to said arresting cable to prevent movement thereof until a predetermined pull tension is exerted on said arresting cable, conduit means connected between the opposite ends of said drag cylinder for maintaining a predetermined pressure differential in said drag cylinder at opposite sides of said drag piston during movement of said drag piston by said arresting cable toward said forward end, means establishing a predetermined pressure in said forward end, a fixed drag cable retracting cylinder, a drag cable retracting piston reciprocatable in the retracting cylinder, retracting cable means connected between said retracting piston and said drag piston passing through the rear end of said drag cylinder and the end of the retracting cylinder, means for admitting pressure to said retracting cylinder behind said retracting piston for tensioning said retracting cable to retract said drag piston to retract said arresting cable.

References Cited in the file of this patent
UNITED STATES PATENTS

| 998,962 | Doyle | July 25, 1911 |
| 1,192,354 | Stevens | July 25, 1916 |
| 2,072,099 | Davidson | Mar. 2, 1937 |
| 2,698,674 | Philbrick | Jan. 4, 1955 |
| 2,731,219 | Cotton et al. | Jan. 17, 1956 |
| 2,765,054 | Rossman | Oct. 2, 1956 |
| 2,767,601 | Reed | Oct. 23, 1956 |

FOREIGN PATENTS

| 663,710 | Great Britain | Dec. 27, 1951 |

OTHER REFERENCES

Publication: "American Society Naval Engineers Journal," vol. 61, No. 2, May 1949, pages 318–331.